Patented Feb. 6, 1951

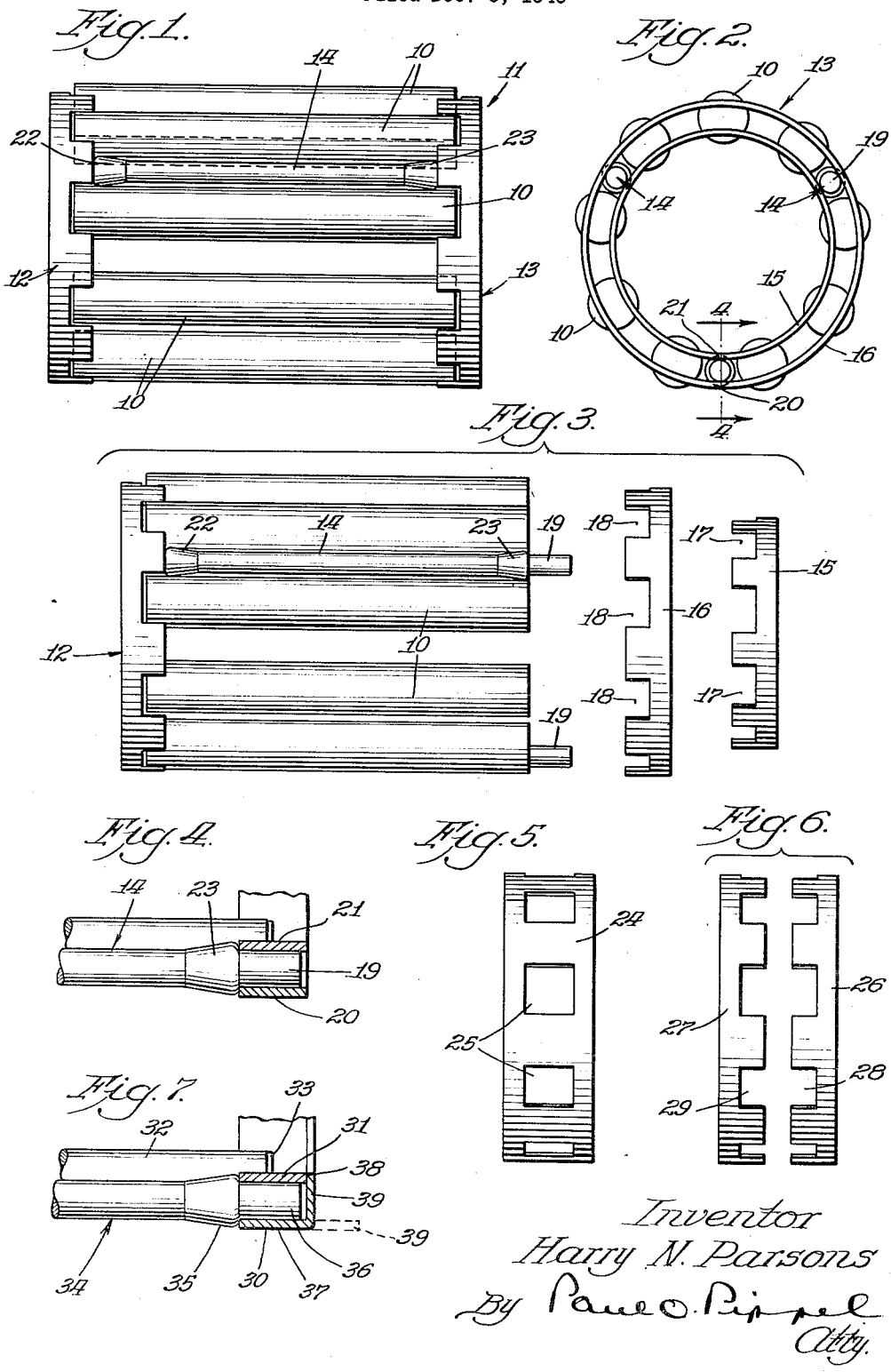
Feb. 6, 1951 — H. N. PARSONS — 2,540,283
ROLLER BEARING
Filed Dec. 5, 1946
Inventor
Harry N. Parsons
By Paul O. Pippel
Atty.

2,540,283

UNITED STATES PATENT OFFICE 2,540,283

ROLLER BEARING

Harry N. Parsons, Chicago, Ill., assignor to International Harvester Company, a corporation of New Jersey Application December 5, 1946, Serial No. 714,341

3 Claims. (Cl. 308—217)

This invention relates to a new and improved roller bearing and has for one of its principal objects the provision of a novel bearing cage.

An important object of this invention is to provide a cage for roller bearings which employs concentric rings at each end of a plurality of spaced rollers.

Another important object of this invention is to provide a roller bearing cage having stay rods which maintain end supporting members in laterally spaced apart position and in addition maintain concentricity of plural rings forming the end members.

A further important object of this invention is to provide a method of constructing a roller bearing cage.

A still further object is to provide an assembly for roller bearings which is simple and economical.

Other and further important objects of this invention will become apparent from the disclosures in the following specification and accompanying drawing, in which:

Figure 1 is a side elevational view of the roller bearing of this invention;

Figure 2 is an end view of the roller bearing shown in Figure 1;

Figure 3 is a view similar to Figure 1 showing the concentric rings composing the end member exploded at one end thereof;

Figure 4 is a sectional view taken on the line 4—4 of Figure 2;

Figure 5 is an elevational view showing an end supporting ring prior to its completion;

Figure 6 shows the end rings after completion;

Figure 7 is a sectional view similar to Figure 4 and showing a modified construction thereof.

The reference numeral 10 indicates generally a plurality of roller bearing members. As shown in Figure 2 these rollers 10 are evenly spaced in an annular path and are relatively large in diameter. The rollers are maintained in spaced position by a cage 11 which consists of spaced end members 12 and 13, and stay or tie rods 14 of relatively smaller diameter. The end member 13 consists of a pair of concentric ring members 15 and 16 having a radial spacing equal to the diameter of the stay rods. The rings 15 and 16 are identical in every respect except for the difference in diameter. This is more completely shown in Figure 3 wherein the inner ring 15 and the outer ring 16 have been shown in an exploded manner. Each of the rings 15 and 16 is provided with notches or pockets 17 and 18 respectively. When the rings are assembled as shown in Figures 1 and 2 and as shown for the member 12 in Figure 3, the pockets 17 and 18 receive the ends of the rollers 10. The pockets 17 and 18 are of a size slightly less than the diameter of the rollers 10 and hence the roller is confined within the cage after assembly is completed.

The stay rods 14 act to maintain the end members 12 and 13 in fixedly laterally spaced apart position. In addition, the stay rods by reason of their ends 19 maintain the inner and outer ring members 15 and 16 in fixed spaced apart concentric relationship as best shown in Figure 2. After assembly of the rollers in the cage 11 the concentric end rings 15 and 16 are welded to the ends 19 of the stay rods 14 at 20 and 21. This is shown more particularly in Figures 2 and 4. In order to facilitate assembly and spacing, the stay rods 14 are provided with annular shoulders 22 and 23. The annular shoulders 22 and 23 are sufficiently large so that the concentric rings 15 and 16 cannot be moved inwardly between these shoulders and hence the lateral spacing of the end members 12 and 13 is easily accomplished with identical spacing on each occasion.

The roller bearing which is described is of the type generally used on farm implements, but of course it should be realized that this bearing construction is not so limited. The rollers 10 are relatively long and it would not be feasible to have the end members 12 and 13 formed from a single piece of material. In the construction of roller bearings which employ relatively short rollers the concentric end rings are formed from single rings such as shown in Figure 5. The ring 24 is provided with rectangular pockets 25 for reception of the roller bearings. The ring 24 is only one of two concentric rings. As shown in Figure 5 only very short rollers could be held within the slots 25 formed in the ring. In the construction of the present bearing cage, the ring 24 is cut through the center thereof as shown in Figure 6, forming two ring members 26 and 27 each having half of the rectangular slots 25 shown as open end pockets 28 and 29. It should be realized that after the ring 24 has been split into the rings 26 and 27 any length rollers may be used merely by changing the length of the stay rods 14. The rings as shown in Figures 5 and 6 may be any diameter. In order to make various sized roller bearings it is only necessary to change the size of diameter of the cage end rings. The rings are relatively standard and for example the ring 15 shown as the inner ring in the bearing of Figures 1, 2, and 3 may be used as an outer ring for a smaller diameter roller bearing, and similarly, for a larger bearing, the present outer ring 16 may be used as an inner ring. From this it is evident that the ring is conducive to good economical manufacture and the assembly is relatively easily accomplished merely by holding the various elements in a jig or the like while welding of the stay rod ends between the concentric end rings.

Heretofore cages for roller bearings have been of the cast type or of sheet metal bent and stamped to form the pockets from a single piece of material. The stamping required considerably more material and necessitated sharp bends which contributed greatly to weakening of the cage. Further, the waste in material is much greater from the formation of an end cage member from flat sheets of material than the relatively small waste which accompanies the formation of the cage end members from a tubular stock. The tube is cut off in short lengths such as shown in Figure 5 and then has stamped therein the rectangular pockets 25 whereupon the ring is then cut in half, forming opposed end rings.

Figure 7 shows a modified construction for an outer concentric ring 30. An inner concentric ring 31 is similar in all respects to the ring 15 shown for the preceding figures. The rings 30 and 31 support a roller bearing member 32 in pockets 33 formed therein. A spacer member or stay rod 34 is provided with an annular shoulder or raised portion 35 against which the inner portions of the rings 30 and 31 abut. An extension 36 of the stay rod 34 extends in between the concentric rings 30 and 31 and is held therein by welding shown at 37 and 38. In the construction shown in this Figure 7 the outer concentric ring 30 is provided with a laterally extending portion 39 shown in dashed lines. After assembly of the roller bearing in the manner described above, the lateral extension 39 is bent downwardly as shown in full lines with the lower end thereof coming flush with the inner concentric ring 31. This construction is advantageous in that it forms a dust and dirt shield and adds to the strength of the bearing cage.

Many details of construction may be varied throughout a wide range without departing from the principles disclosed herein, and I therefore do not propose limiting the patent granted hereon otherwise than as necessitated by the appended claims.

What is claimed is:

1. A bearing comprising a plurality of rollers, a cage for supporting the ends of said rollers, said cage including a pair of end members, and a plurality of stay rods extending between said end members and maintaining them in spaced apart position, said end members having inwardly opening sockets to receive and hold said rollers, and each of said end members including a pair of concentric rings, said sockets formed of less diameter than the diameter of the rollers and greater than the radial distance between the concentric rings, said stay rods having end portions extending between and maintaining said rings concentric.

2. A bearing comprising a plurality of large diameter rollers, a cage for supporting the ends of said rollers, said cage including a pair of end members, and a plurality of relatively small diameter stay rods extending between said end members and maintaining them in spaced apart position, said end members having inwardly opening sockets to receive and hold said rollers, and each of said end members including a pair of concentric rings radially spaced apart a distance equal to the diameter of the stay rods, said stay rods having end portions extending between and maintaining said rings concentric and said stay rod end portions welded between said concentric rings.

3. A cage for large diameter roller bearings comprising laterally spaced end members, said end members including concentric rings with inwardly opening roller receiving pockets formed to include a chord of said large diameter roller and thus confine the roller therein, stay rods of relatively small diameter having laterally spaced shoulders and end portions extending beyond said shoulders of a diameter equal to the radial spacing of said concentric rings, said end portions positioned between the concentric rings of the end members and said end members abutting said spaced shoulders, and weld fastening means holding said end portions between the concentric rings to fixedly maintain said end members in spaced apart position and said rings in concentricity.

HARRY N. PARSONS.

REFERENCES CITED

The following references are of record in the file of this patent:

UNITED STATES PATENTS

| Number | Name | Date |
|---|---|---|
| 979,881 | Palmer | Dec. 27, 1910 |
| 1,372,146 | Klavon | Mar. 22, 1921 |
| 1,609,618 | Gallagher et al. | Dec. 7, 1926 |
| 2,052,292 | Hartmann | Aug. 25, 1936 |
| 2,327,237 | Baden | Aug. 17, 1943 |